United States Patent

[11] 3,626,177

[72] Inventor Raymond C. Franke
Glenshaw, Pa.
[21] Appl. No. 39,790
[22] Filed May 22, 1970
[45] Patented Dec. 7, 1971
[73] Assignee Westinghouse Air Brake Company
Swissvale, Pa.

[54] FAIL-SAFE VEHICLE BRAKE ASSURING
9 Claims, 2 Drawing Figs.
[52] U.S. Cl. ................................................ 246/1,
246/182 B, 303/20
[51] Int. Cl. ................................................ B60t 13/00
[50] Field of Search ............................................. 303/20;
246/182 B, 182 C

[56] References Cited
UNITED STATES PATENTS
3,457,403 7/1969 Smith, Jr. ..................... 246/182 C 3,525,553 8/1970 Carp et al. ..................... 303/20 X Primary Examiner—Arthur L. La Point
Assistant Examiner—George H. Libman
Attorneys—H. A. Williamson, A. G. Williamson, Jr. and J. B. Sotak ABSTRACT: This invention relates to a fail-safe vehicle brake assuring circuit for assuring that a vehicle is decelerating at a sufficient rate to a predetermined speed along a predetermined path. The circuit comprises a speed measuring device coupled to the vehicle and electrically coupled to a redundant channel deceleration detection network, which is, in turn coupled to an interlocking circuit having an output. The interlocking circuit also receives a vehicle overspeed signal input and a zero velocity input signal. The absence of an output signal on the output of the interlocking circuit is indicative of insufficient vehicle deceleration or of any speed condition coupled with a component failure in the brake assuring circuit.

FAIL-SAFE VEHICLE BRAKE ASSURING

My invention relates to a fail-safe vehicle brake assuring circuit.

More specifically, my invention relates to a fail-safe vehicle brake assuring circuit for assuring that a vehicle is decelerating at a sufficient rate to a predetermined speed along a predetermined path. The circuit comprises a speed measuring device coupled to the vehicle and electrically coupled to a redundant channel deceleration detection network, w which is, in turn coupled to an interlocking circuit having an output. The interlocking circuit also receives a vehicle overspeed signal input and a zero velocity input signal. The absence of an output signal on the output of the interlocking circuit is indicative of insufficient vehicle deceleration or of any speed condition coupled with a component failure in the brake assuring circuit.

In the automatic operation of transit vehicles, it is necessary to insure that a train is decelerating at an adequate rate after an overspeed condition has been established. For example, conventional railway track circuits may be divided into different sections having varying permissible vehicle speed limits assigned therewith in accordance with the requirements to be met with respect to particular vehicular traffic patterns. A typical portion of track circuitry may include, therefore, a plurality of vehicular speed limited sections, e.g., three sections respectively having vehicular speed limits of 50, 25, and 0 miles per hour. Such decreasing speed limit values may be employed where, for instance, another vehicle is at rest at the end of the 0 mile per hour section of track circuitry. In order that a moving train does not move into the 0 mile per hour track section, which movement would increase the danger of collision with the resting vehicle, vehicle service brakes are employed normally for automatic slow down when the vehicle receives track signals indicative of the permissible speed within a particular section of track. Should these service brakes fail, however, it becomes necessary to make an emergency brake application. This emergency brake application is accomplished through the detection of vehicle deceleration, i.e., the detection of whether or not the vehicle is decelerating at a sufficient rate to a predetermined speed determined by the speed limit within a particular track circuit section. Thus, the detection of vehicle deceleration is a vital element for automatic train control and must be implemented with a fail-safe device for assuring emergency vehicle brake application.

Historically, the detection of vehicle deceleration has been accomplished by the incorporation of an electrofluidic inertial device coupled to the vehicle body. A fluid such as mercury was inserted into an elliptical tubular arrangement and was initially balanced so as not to touch an electrical contact going to an emergency brake application circuit. Accordingly, if the train was decelerating at a permissible rate within a particular section of track, the emergency brake circuit would be completed since the mercury has moved as a function of deceleration to touch the electrical contact and therefore vehicle service brakes are performing adequately. If the train began decelerating at an insufficient rate to decrease to an appropriate speed, the mercury would not flow enough to touch the electrical contact due to the insufficient inertial force of the vehicle caused by insufficient inertial force of the vehicle caused by insufficient vehicle deceleration. Therefore, a circuit to the vehicle emergency brakes would not be completed and an indication of too small a vehicle deceleration would appear for the automatic application of the vehicle emergency brakes.

One disadvantage of the above-noted prior electrofluidic type of deceleration detection is that it is an inertial device and is, accordingly, a grade-sensitive device. For example, if the vehicle were to move along a 5 percent grade, which is a normal track circuit grade, an inherent deceleration uncertainty of 1.1 mile per hour per second would be encountered unless the electrofluidic inertial deceleration detection device is adjusted to compensate for such error. Further, typical service braking is on the order of 2 miles per hour per second and an inherent error of 1 mile per hour per second would be substantially detrimental to proper deceleration. It is readily apparent that required adjustment of this type would be quite frequent in accordance with grade variation along the path followed by the vehicle. However, such adjustment is practically impossible when taking into consideration that the vehicle receives no indication of grade.

It is therefore an object of this invention to provide a novel fail-safe brake assuring circuit for assuring that a vehicle is decelerating at a sufficient rate to a predetermined speed along a predetermined path.

Another object of this invention is to provide an improved fail-safe brake assuring circuit which is insensitive to grade because of the incorporation of an axle generator coupled to a vehicle axle rather than to the body of the vehicle itself.

Yet another object of this invention is to provide a new and improved fail-safe brake assuring circuit which insures a sufficient vehicle deceleration rate by the incorporation of an axle generator electrically coupled to a redundant channel deceleration detector, which, in turn, controls in interlocking circuit receiving overspeed and zero velocity input signals.

Still another object of this invention is to provide a novel fail-safe brake assuring circuit having a continuing comparison check to insure that the circuit detection will not degrade to a point of detecting less than actual deceleration.

Still another object of this invention is to provide an improved fail-safe brake assuring circuit having a cycle check whereby the outputs of a redundant channel deceleration detector must be simultaneously in a first state each time a vehicle overspeed condition exists, and simultaneously in a second state when a vehicle zero velocity condition exists.

In the attainment of the foregoing objects a fail-safe brake assuring circuit has been invented for assuring that a vehicle is decelerating at a sufficient rate to a predetermined speed along a predetermined path. The circuit comprises a speed measuring device, a redundant channel deceleration detection network, and an interlocking circuit. The speed measuring device is coupled to a railway vehicle and has an output signal the frequency of which is proportional to the speed of the vehicle. The redundant channel deceleration detection network is electrically coupled to the axle generator device to receive the output signal from the axle generator device. It has at least a first and a second detection channel having respective outputs each having a first and a second state. The second state of these channel outputs appears only when the rate of change of the frequency of the axle generator output signal with respect to time is greater than a predetermined threshold value set within the redundant channel deceleration detection network.

The interlocking circuit is coupled, electromagnetically in the preferred embodiment to the redundant channel deceleration detection network by the first and second detection channel outputs. It also receives a vehicle overspeed signal input whenever the vehicle is traveling at a speed greater than a preselected authorized speed. The interlocking circuit further receives a zero velocity input signal whenever the vehicle is traveling at a very low predetermined speed, preferably zero speed.

The interlocking circuit produces an output signal only when the state on each of the detection channel outputs is in agreement. It produces no output whenever the state of the first deceleration detection channel output and the state of the second deceleration detection channel output are in disagreement longer than a preselected time period; or whenever the first and second deceleration detection channel outputs are in the first state while the interlocking means receives an overspeed signal for at least the above-noted preselected time period; or whenever the first and second deceleration detection channel outputs are in the second state while the interlocking means receives a zero velocity signal for the predetermined time period.

Other objects and advantages of the present invention will become apparent from the ensuing description of illustrative embodiments thereof, in the course of which reference is made to the accompanying drawings in which.

A description of the above embodiments will follow and then the novel features will be presented in the appended claims.

Figure 1:
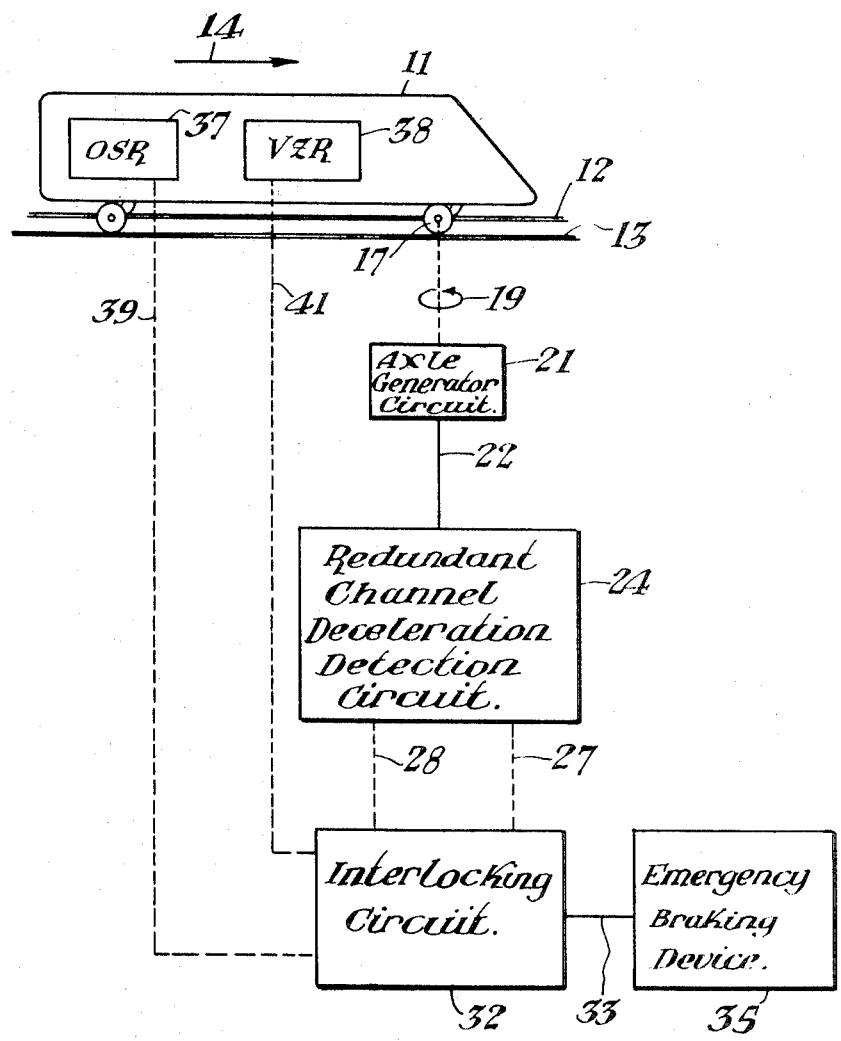
FIG. 1 illustrates in block diagram form a preferred embodiment of the invention.

Reference is now made to the drawings, and particularly to FIG. 1 wherein a railway vehicle 11 is traveling along tracks 12 and 13 in the direction indicated by arrow 14. A speed measuring device which may be a conventional axle generator circuit 21 is connected to an axle 15 through wheel 17 of vehicle 11 through a driving connecting link shown by dotted line 19. This rotating input 19 or driving link, will provide axle generator circuit 21 with a rotary input that will be converted into a frequency signal output, the frequency of which is proportional to vehicle speed. It will be appreciated that other types of suitable speed measuring devices than that shown may be incorporated into the circuit without limiting its application. The frequency output from circuit 21 will appear on lead 22.

Immediately beneath axle generator circuit 21 is depicted a redundant channel deceleration detection circuit 24, electrically coupled to the output 22 of axle generator circuit 21. The redundant channel deceleration detection circuit 24 is preferably electromagnetically coupled to an interlocking circuit 32 via couplings 27 and 28 shown in dotted line. The interlocking circuit 32 is also preferably electromagnetically coupled to a vehicle overspeed relay circuit 37 and a vehicle zero velocity relay circuit 38 to receive inputs therefrom via couplings 39 and 41, shown in dotted line, respectively. The interlocking circuit 32 has an output 33 which ordinarily produces an output signal to an emergency braking device 35 when the vehicle 11 is functioning properly thereby preventing the application of the emergency braking device. It will be noted that the emergency braking device 35 may be a conventional magnetic valve which opens when a signal is removed from its input coil. By functioning properly, it is meant that assuming the vehicle 11 has received a signal that it is entering a speed zone wherein its speed must be reduced to a predetermined authorized speed which requires vehicle deceleration, then the vehicle 11 will decelerate to that authorized speed at a sufficient deceleration rate. Accordingly, if the vehicle 11 is traveling at some speed other than zero velocity into a speed zone of the aforementioned character and the vehicle 11 is decelerating at a proper rate, and the circuitry of the redundant channel deceleration detection circuit 24 is properly operating, there will be an output signal on output 33 of interlocking means 32 to emergency braking device 35. Further if the vehicle 11 is not moving, i.e. at zero velocity as indicated by zero velocity relay circuit 38, and the circuitry of the redundant channel deceleration detection circuit 24 is properly operating, there will be an output signal on output 33 of interlocking means 32 to emergency braking device 35.

Contrawise, if the vehicle 11 is traveling at some speed other than zero velocity into a speed zone of the aforementioned character, and the vehicle 11 is not decelerating at a proper rate, and if there is an overspeed condition indicated by the overspeed relay circuit 37 and/or the circuitry of the redundant channel detection circuit 24 is improperly operating, there will be no output signal on output lead 33 of interlocking means 32. Further, if the vehicle 11 is operating at less than overspeed, e.g. at zero velocity as indicated by zero velocity relay circuit 38, and/or the circuitry of the redundant channel deceleration detection circuit is operating improperly, there will be no output signal on output 33 of interlocking means 32.

Figure 2:
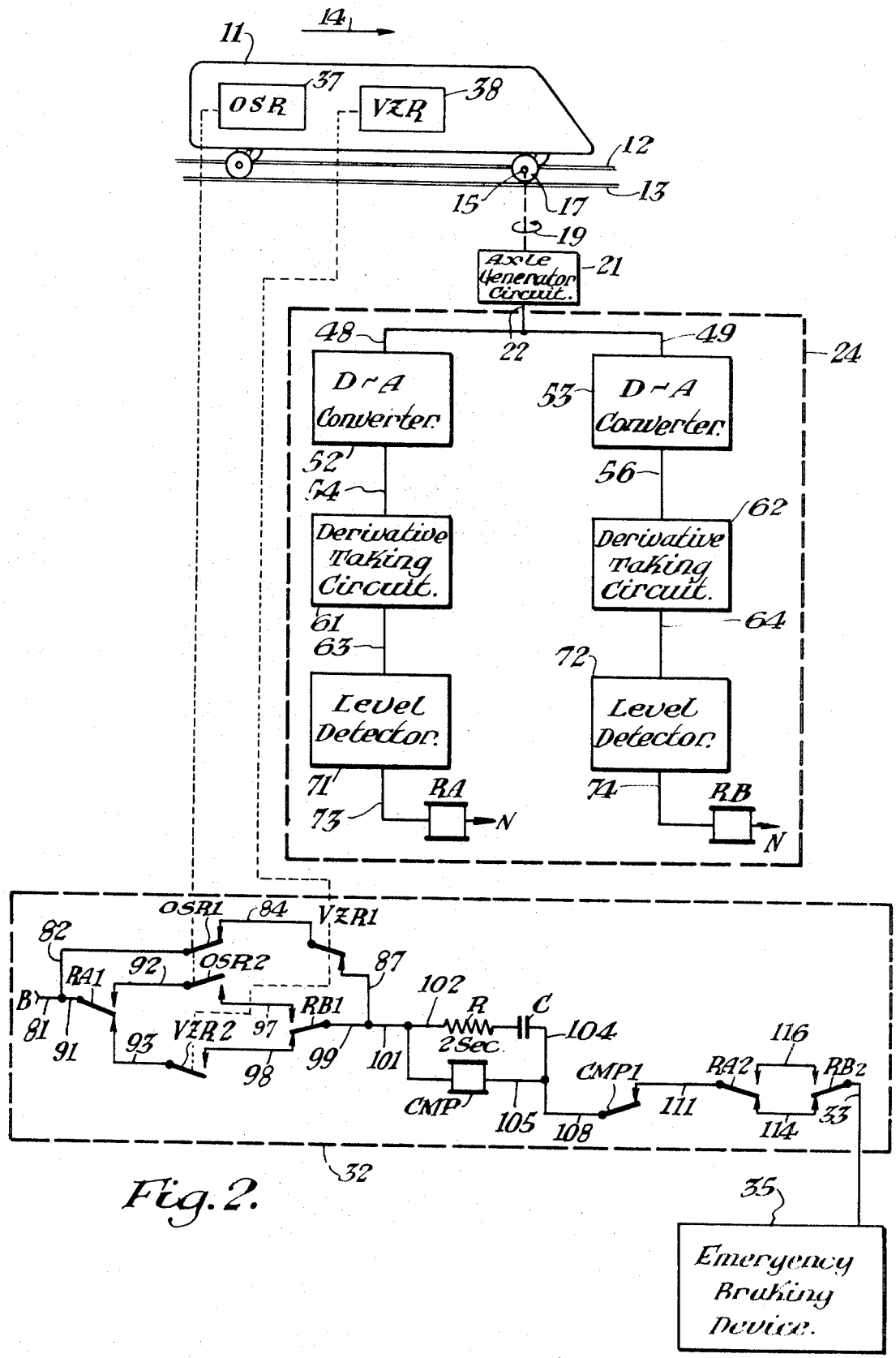
FIG. 2 represents a diagram including both block and partial circuit configuration of the preferred embodiment of FIG. 1.

A further understanding of the invention will be had by viewing FIG. 2 which sets forth the preferred embodiment of FIG. 1 in partial circuit form. Shown in FIG. 2 is vehicle 11 traveling along tracks 12 and 13 in a direction indicated by arrow 14. Once again, the conventional axle generator circuit 21 is connected to an axle 15 through a wheel 17 of vehicle 11 via driving connecting link 19 shown in dotted line. As previously described, the input 19 or driving link, will provide axle generator circuit 21 with rotary input that is converted into a frequency signal output preferably of the digital type from axle generator circuit 21 on lead 22. The frequency of the frequency signal output is proportional to vehicle speed. As noted previously, immediately beneath axle generator circuit 21 is redundant channel deceleration detection network 24, electrically coupled to output 22 of axle generator circuit 21. The redundant channel deceleration detection network 24 will now be further described.

Preferably shown within dotted line 24, representative of the redundant channel deceleration detection network, are two identical channels respectively containing conventionally digital-to-analog converters 52 and 53 respectively, and electrically coupled to output 22 of axle generator circuit 21 to receive the aforementioned frequency signal proportional to vehicle speed. These digital-to-analog converters 52 and 53 convert the frequency signal proportional to vehicle speed to identical analog electrical signals likewise proportional to vehicle speed, which analog electrical signals respectively appear on output leads 54 and 56 from digital to analog converters 52 and 53. These analog electrical signals are input respectively to derivative taking circuits 61 and 62, which circuits 61 and 62 differentiate the analog signals input on leads 54 and 56 with respect to time. Since, in fact, velocity is being differentiated with respect to time, derivative taking circuits 61 and 62 will produce outputs 63 and 64 respectively, which outputs will be proportional to vehicle deceleration. The outputs 63 and 64 are electrically coupled to respective inputs to conventional level detectors 71 and 72 which are preset at a preselected threshold value to produce respective outputs on leads 71 and 74 whenever vehicle deceleration is sufficient, i.e. the magnitude of vehicle deceleration is numerically greater than the above-noted preselected level detector threshold value. The output leads 73 and 74 are respectively electrically coupled to relays RA and RB which relays are preferably normally deenergized, and will become energized whenever respective output signals appear on leads 73 and 74 from level detectors 71 and 72 respectively.

Also shown in FIG. 2 is previously referred to interlocking circuit 32 which is preferably electromagnetically coupled to redundant channel deceleration detection circuit 24 via contacts RA1 and RA2 of relay RA, and contacts RB1 and RB2 of relay RB. The interlocking circuit 32 is also preferably electromagnetically coupled to vehicle overspeed relay circuit 37 on trail 11 and vehicle zero velocity relay circuit 38 on train 11 by front contact OSR1 and back contact OSR2 of overspeed circuit OSR and by back contact VZR1 and front contact VZR2 of zero velocity circuit VZR.

Included in the interlocking circuit is a comparator relay CMP to which is electrically coupled a feedback circuit consisting of a resistor R and a capacitor C. The values of resistor R and capacitor C are selected to provide a predetermined time constant, the time of which relay CMP will remain energized if no other energization path is maintained for relay CMP and assuming capacitor C is initially fully charged. At the expiration of the predetermined time constant period, preferably shown to be 2 seconds, if no energization path is established through relay CMP, then CMP will deenergize and application of emergency brakes, not shown, will ensue.

The possible energization paths for relay CMP are preferably shown in FIG. 2 to be:

1. From battery terminal B over lead 81, lead 82, front contact OSR1 of overspeed circuit OSR, lead 84, back contact VZR1 of zero velocity circuit VZR, lead 87, lead 101, comparator relay CMP, lead 105, lead 108, front contact CMP1 of relay CMP, lead 111, back contact RA2 of relay RA, lead 114, back contact RB2 of relay RB, to lead 33, and finally to emergency braking device 35. This path will be referred to later as energization path one for comparator relay CMP.

2. From battery terminal B over lead 81, lead 91, front contact RA1 of relay RA, lead 92, back contact OSR2 of overspeed circuit OSR, lead 97, front contact RB1 of relay RB, lead 99, lead 101 comparator relay CMP, lead 105, front contact CMP1 of relay CMP, lead 111, front contact RA2 of relay RA, lead 116, front contact RB2 of relay RB, to lead 33, and finally to emergency braking device 35. This path will be referred to later as energization path two for comparator relay CMP.

3. From battery terminal B over lead 81, lead 91, back contact RA1 of relay RA, lead 93, front contact VZR2 of zero velocity circuit VZR, lead 98, back circuit RB1 of relay RB, lead 99, lead 101, comparator relay CMP, lead 105, lead 108, front contact CMP1 of relay CMP, lead 111, back contact RA2 of relay RA, lead 114, contact RB2 of relay RB, to lead 33, and finally to emergency braking device 35. This path will be referred to later as energization path three for comparator relay CMP.

CIRCUIT OPERATION

Four situations of vehicle motion will be employed to describe the circuit operation of the fail-safe vehicle brake assuring circuit embodied in FIGS. 1 and 2 with particular reference to FIG. 2.

The first situation is when the vehicle 11 is at rest, or zero velocity. Under the rest situation, wheel 17 of vehicle 11 will not be rotating and hence, there will be a zero input to axle generator circuit 21. Accordingly, the axle generator circuit 21 will produce a zero output on lead 22 to redundant channel deceleration detection circuit 24, and particularly on leads 48 and 49 to digital-to-analog converters 52 and 53 respectively. The digital-to-analog converters 52 to 53 will therefore produce signals on leads 54 and 56 respectively indicative of zero vehicle velocity to derivative taking circuits 61 and 62 respectively. Since the derivation of zero with respect to time is zero, derivative taking circuits 61 and 62 will produce zero outputs on leads 63 and 64, respectively. These outputs on leads 63 and 64 are indicative of zero deceleration, which zero deceleration is below the previously mentioned threshold values of level detectors 71 and 72 which respectively receive as inputs, the outputs on leads 63 and 64. Accordingly, no output signals will appear on output leads 73 and 74 of level detectors 71 and 72 respectively to relays RA and RB, respectively. Hence, relays RA and RB, which were preferably initially deenergized, will remain deenergized, and contacts RA1, RA2 of relay RA and RB1, RB2 of relay RB will engage their back contact portions as shown in FIG. 2. Further, since a zero velocity is being experienced by the vehicle 11, zero velocity relay circuit 38, or VZR, will be in operation to cause the opening of back contact VZR1 and closing of front contact VZR2 associated with zero velocity circuit 38. The only path of energization for comparator relay CMP, therefore, is energization path three, noted above. It will be noted that because of open back contact OSR2 associated with previously described overspeed circuit 37 or OSR, at zero velocity all of contacts RA, RA2 of relay RA and RB1, RB2 of relay RB must be engaging their respective back contact portions, i.e., relays RA and RB must be deenergized to keep comparator relay CMP energized, the importance of which will be noted later.

The second of the four above-noted situations is when the vehicle 11 is in motion along tracks 12 and 13, in the direction of the arrow 14 and presumably entering a track section, not shown, with a given maximum velocity assigned thereto. Accordingly, through cab signaling circuitry, not shown, the vehicle 11 will receive a signal indicative of the maximum allowable speed, and if traveling at a speed greater than the maximum allowable speed for the given track section, the vehicle 11 should begin to slow down, or decelerate. Assuming that the deceleration rate of vehicle 11 is adequate for this purpose, the rotation of wheel 17 will be input to axle generator circuit 21 via driving link 19. Axle generator circuit 21 will, in turn provide a frequency signal output of which the frequency is proportional to be velocity of vehicle 11. This frequency signal output on lead 22 is input to the redundant channel deceleration detection network 24, and particularly to each of digital-to-analog converters 52 and 53 over leads 48 and 49 respectively. Each of digital-to-analog converters 52 and 53 will convert the frequency signal it receives into an analog signal indicative of the velocity of vehicle 11 on leads 54 and 56, respectively. These analog signals indicative of velocity are then input to each of derivative taking circuits 61 and 62, which derivative taking circuits 61 and 62 will differentiate their respective incoming analog signals with respect to time to provide output signals on leads 63 and 64, respectively, indicative of the instantaneous deceleration of vehicle 11. Recalling that it was assumed that vehicle 11 would be properly decelerating within the given speed zone, the signals indicative of vehicle deceleration on leads 63 and 64 will be greater than the set threshold value for level detectors 71 and 72. Therefore, level detectors 71 and 72 to which are respectively input the deceleration signals on leads 63 and 64, will provide outputs to their respectively associated relays RA and RB. Hence, assuming relays RA and RB were initially deenergized, they will become energized for the duration of the overspeed condition and contacts RA1, RA2 of relay RA and RB1, RB2 of relay RB will engage their front contact portions. Noting that since the vehicle 11 is now in motion, i.e. there is no longer a zero velocity condition, back contact VZR1 of zero velocity circuit VZR will be closed, while front contact VZR2 of zero velocity circuit VZR will be open. Further, front contact OSR1 of overspeed relay circuit OSR will be opened for the duration of the overspeed condition. Accordingly, the only path of energization for comparator relay CMP is energization path two, noted above. While the proper deceleration rate is attained the outputs 63 and 64 from derivative taking means 61 and 62, respectively will remain above the levels of level detectors 71 and 72 until deceleration is no longer required, i.e. until the overspeed condition subsides. When this occurs, front contact OSR1 of overspeed circuit OSR will close and back contact OSR2 of overspeed circuit OSR will open. Further, since the outputs 63 and 64 of derivative taking means 61 and 62, respectively, no longer exceed the levels of level detectors 71 and 72 there will be no outputs on leads 73 and 74 and relays RA and RB will deenergize causing contacts RA1 and RA2 of relay RA, and contacts RB1 and RB2 of relay RB to engage their back portions. Accordingly, the only path of energization for relay CMP is path one.

The third or the four above-noted situations is when the vehicle 11 is in motion along tracks 12 and 13 in the direction of arrow 14 and presumably entering a track section with a given maximum velocity assigned thereto. Accordingly, through cab signaling circuitry, now shown, the vehicle 11 will receive a signal indicative of the maximum allowable speed and, once again, if traveling at a speed greater than the maximum allowable speed for the given track section, the vehicle 11 should slow down or decelerate. Let it now be assumed, however, that the deceleration rate of vehicle 11 is inadequate for this purpose, i.e. vehicle 11 is not decreasing velocity sufficiently and an overspeed condition exists. The rotation of wheel 17 of vehicle 11 will be input to axle generator 21 via driving link 19 as previously described. Axle generator circuit 21 will, in turn, provide a frequency signal output on lead 22, the frequency of which is proportional to the velocity of vehicle 11. As noted above, this frequency signal output on lead 22 is delivered to redundant channel deceleration detection network 24, and particularly to each of digital-to-analog converters 52 and 53 over leads 48 and 49, respectively. Again, each of digital-to-analog converters 48 and 49 will convert the frequency signal it receives into an analog electrical signal indicative of the velocity of vehicle 11 on leads 54 and 56, respectively. And again, these analog signals indicative of velocity are input to each of derivative taking circuits 61 and 62, which derivative taking circuits 61 and 62 will differentiate their respective incoming analog signals with respect to time to provide output signals on leads 63 and 64, respectively, indicative of the instantaneous deceleration of vehicle 11. Recalling that in this, the third of the aforementioned four situations, it is assumed that the vehicle 11 is not sufficiently decreasing speed, i.e. vehicle 11 is not decelerating sufficiently, the signals indicative of vehicle deceleration on leads 63 and 64 will be less than the set threshold value for level detectors 71 and 72 to which these deceleration signals are input. Therefore, level detectors 71 and 72 will provide no outputs on leads 73 and 74 to energize relays RA and RB, and relays RA and RB remain deenergized. Accordingly, contacts RA1, RA2 of relay RA and contacts RB1, RB2 of relay RB will engage their back contact portions. Noting that since the vehicle is in motion, i.e. there is no longer a zero velocity condition, back contact VZR1 of zero velocity circuit VZR will be closed, while front contact VZR2 of zero velocity circuit VZR will be open. Further noting that the vehicle 11 is experiencing an overspeed condition, front contact OSR1 of overspeed circuit OSR will be opened, while back contact OSR2 of overspeed circuit OSR will be closed. Hence, with the opening of front contact OSR1 of overspeed circuit OSR, the opening of back contact VZR2 of zero velocity circuit VZR and the engagement of back contact portions by contacts RA1, RA2 of relay RA and contacts RB1, RB2 of relay RB, no path for energization for comparator relay CMP is maintained, and if the proper deceleration rate is not attained within a preselected time of 2 seconds, relay CMP will deenergize thereby causing the opening of front contact CMP1 of relay CMP, and providing no output on lead 33 to emergency braking device 35, thereby assuring application of train emergency brakes, now shown. It will be appreciated, therefore, that because of open front contacts OSR1 of overspeed circuit OSR and VZR2 of zero velocity circuit VZR, at an overspeed condition all of contacts RA1, RA2 of relay RA and RB1, RB2 of relay RB must be engaging their respective front contact portions, i.e. relays RA and RB must be energized to keep comparator relay CMP energized, the importance of which will be noted later.

The remaining of the above-mentioned four situations is really twofold: (1) vehicle 11 is moving into a track section with a maximum allowable speed assigned thereto, and is adequately decelerating, but there is a circuit failure causing either relay RA or relay RB to energize (simultaneous failures are presumed not to occur), or (b) vehicle 11 is moving into a track section with a maximum allowable speed assigned thereto, and is decelerating inadequately, but there is a circuit failure such that either RA or RB remains deenergized (again, simultaneous failures are presumed not to occur.) In both situations, a disagreement between contacts RA1 of relay RA and RB1 of relay RB, and a disagreement between contacts RA2 of relay RA and RB2 of relay RB will occur. In either situation, comparator relay CMP will be maintained energized for the preferable time period of 2 seconds as determined by the values of resistor R and capacitor C. Should disagreement continue for longer than 2 seconds, comparator relay CMP will deenergize causing front contact CMP1 of relay CMP to open and not allowing a signal to an emergency braking device 35 thereby causing emergency braking application. Further, taking into account the positioning of contacts OSR1, OSR2 of overspeed circuit OSR and contacts VZR1, VZR2 of zero velocity circuit VZR in either of the two above-cited subsituations, should agreement between contacts RA1 of relay RA and RB1 of relay RB, and agreement between contacts RA2 of relay RA and RB2 of relay RB be reestablished within 2 seconds from the time of initial disagreement, the alignment of these contacts must be such that one of the three aforementioned independent energization paths for comparator relay CMP may be maintained, thereby reestablishing proper service brake application. Unless this occurs, no signal will reach the emergency braking device 35. Accordingly, a continuous comparison check is established to insure that the overall circuit cannot degrade to a point of detecting less deceleration.

Further recalling that it has been previously stated that under a zero velocity condition, contacts RA1, RA2 of relay RA and contacts RB1, RB2 of relay RB must be engaging their back portions, i.e. relays RA and RB must be deenergized, and also recalling that under an overspeed condition, contacts RA1, RA2 of relay RA and contacts RB1, RB2 of relay RB must be engaging their front portions, i.e. relays RA and RB must be energized, it will be appreciated that a cycle check has been established to insure that a common mode failure, where, for example, both relays RA and RB are constantly energized, cannot exist for an entire stop-start cycle for vehicle 11.

It will further be appreciated that all contact orientations above-described, as well as relay energization and deenergization may be reversed without departing from the spirit of the invention as described by the preferred embodiments herein.

While the invention has been described with reference to a particular embodiment, it will be understood that other modifications, changes, and variations may be made by those skilled in the art without departing from the spirit of the invention and the scope of the claims.

Having thus described my invention, what I claim is:

1. A fail-safe vehicle brake assuring circuit for assuring that a vehicle is decelerating at a sufficient rate to a predetermined speed along a predetermined path said circuit comprising:
   a. speed measuring means coupled to said vehicle and having an output signal the frequency of which is proportional to vehicle speed,
   b. redundant channel deceleration detection means having at least a first and a second detection channel each receiving said output signal from said axle generator means,
   said first and said second detection channels having respective outputs, said outputs of said first and said second detection channels each having a first and a second state, said second state appearing only when the rate of change of said frequency of said axle generator output signal with respect to time is greater than a predetermined value,
   c. interlocking means coupled to said redundant channel deceleration detection means via said first and said second detection channel outputs,
   said interlocking means receiving an overspeed signal from said vehicle whenever said vehicle is traveling at a speed greater than a preselected authorized speed, and a zero velocity signal from said vehicle whenever said vehicle is traveling at less than a very low predetermined speed,
   said interlocking means producing an output only when the states on each of said first and said second deceleration detection channel outputs are in agreement,
   said interlocking means producing no output whenever the state of said first deceleration detection channel output and the state of said second deceleration detection channel output are in disagreement for longer than a preselected time period, or whenever said first and said second deceleration detection channel outputs are in said first state while said interlocking means receives said overspeed signal for longer than said preselected time period, or whenever said first and said second deceleration detection channel outputs are in said second state while said interlocking means receives said zero velocity signal for longer than said preselected time period, or whenever any speed condition concurs with a component failure in said brake assuring circuit.

2. The fail-safe brake assuring circuit of claim 1 wherein first and second detection channels of said redundant channel deceleration detection means include respectively,
   a. first and second digital-to-analog conversion means electrically coupled to said speed measuring means to receive said output signal the frequency of which is proportional to vehicle speed, each of said first and second conversion means having an output, said conversion means converting said output signal to analog signals indicative of vehicle speed and appearing on said outputs of said first and second digital-to-analog conversion means, b. first and second derivative taking means each having an output respectively receiving said first and second digital-to-analog conversion means outputs and differentiating said digital-to-analog conversion means outputs with respect to time to provide signals indicative of vehicle deceleration appearing on said outputs of said first and second derivative taking means, c. first and second level detecting means each having an output respectively receiving said first and second derivative taking means outputs, said first and second level detecting means each preset at the same preselected threshold value to provide signals on said outputs of said first and second level detecting means whenever the magnitude of said signals on said first and second derivative taking means outputs exceed said preselected threshold value, d. first and second interlocking circuit control means controllingly coupled to said interlocking means respectively having first and second states and respectively electrically coupled to said outputs of said first and second level detecting means, said first and second interlocking circuit control means being in said first state whenever said outputs of said first and second level detector means have signals appearing thereon, said first and second interlocking circuit control means being in said second state whenever said outputs of said first and second level detector means have no signals appearing thereon.

3. The fail-safe brake assuring circuit of claim 1 wherein said interlocking means includes timing control means to assure the absence of an output from said interlocking means at the end of said preselected time period whenever the state of said first deceleration detection channel output and the state of said second deceleration detection channel output are in disagreement for longer than said preselected time period, or whenever said first and said second deceleration detection channel outputs are in said first state while said interlocking means receives said overspeed signal for longer than said preselected time period, or whenever said first and said second deceleration detection channel outputs are in said second state while said interlocking means receives said zero velocity signal for longer than said preselected time period, or whenever any speed condition concurs with a component failure in said brake assuring circuit.

4. The fail-safe brake assuring circuit of claim 1 wherein said speed measuring means comprises a driving link rotatably coupled to an axle of said vehicle and providing an input indicative of vehicle velocity to a mechanical to electrical converting circuit having an electrical output indicative of vehicle speed.

5. The fail-safe brake assuring circuit of claim 1 wherein said first and second interlocking circuit control means are electromagnetic devices.

6. The fail-safe brake assuring circuit of claim 5 wherein said first and second interlocking control means are relays.

7. The fail-safe brake assuring circuit of claim 3 wherein said timing control means comprises a timing control electromagnetic device and a resistor-capacitor series circuit electrically coupled to said timing control electromagnetic device.

8. The fail-safe brake assuring circuit of claim 7 wherein said timing control electromagnetic device is a relay.

9. The fail-safe brake assuring circuit of claim 1 wherein a proper braking indication circuit is electrically coupled to said output of said interlocking means to provide an indication of proper vehicle braking operation.

* * * * *